UNITED STATES PATENT OFFICE.

HENRY TILL, OF PITTSBURG, CALIFORNIA.

GRAVY COMPOUND AND PROCESS OF MAKING SAME.

1,193,739.　　　　Specification of Letters Patent.　　Patented Aug. 8, 1916.

No Drawing.　　Application filed May 12, 1915.　Serial No. 27,609.

*To all whom it may concern:*

Be it known that I, HENRY TILL, a citizen of the United States, residing at Pittsburg, in the county of Contra Costa and State of California, have invented certain new and useful Improvements in Gravy Compounds and Processes of Making Same, of which the following is a specification.

This invention aims to disclose a novel composition for making gravy and the process of preparing the same.

Ordinarily in making gravy a quantity of flour is added to the juices and some of the fat resulting from the roasting of meat, being constantly stirred while over the fire until the flour has browned sufficiently, after which water is added until after continued boiling and stirring the gravy is of the desired consistency. This method involves considerable time and close attention in order to obtain the desirable brown color of the gravy and at the same time prevent the burning of the flour.

In consideration of the foregoing, it is the object of the present invention to provide a compound which may be readily and conveniently employed, and which will require no skill whatsoever in its use, not only in thickening the gravy but having the gravy of a desirable color and tastefully seasoned.

In preparing the compound a suitable quantity of flour is browned through heat while being constantly stirred and until it is of an even light brown color. To six parts by weight of the flour prepared in this manner there is added about one part of a mixture of spices, herbs and flavoring substances consisting of the following ingredients in about the proportions stated:—Salt 50 parts; pepper 15 parts; ginger 6 parts; nutmeg 3 parts; allspice 3 parts; cinnamon 2 parts; mace 2 parts; cloves 1 part; dehydrated onion 5 parts; dehydrated celery 1 part; dehydrated parsley 1 part; dehydrated carrot 1 part, a trace of oil of lemon, and, if desired, some powdered dried mushrooms. Instead of the dehydrated vegetables a relative amount of their essential oils may be used. Two parts of the mixture thus prepared are then mixed in a warm pan with about one part of a mixture of fats consisting preferably of two parts of cottolene or a similar product, one part of cocoa butter, and one part of paraffin, adding in the meantime a sufficient quantity of caramel to impart to the mixture the desired color. The mixture, while warm, and in a thick half-liquid paste form, is poured into molds of any desired shape and allowed to cool and set, or it may be spread out in even thickness and after cooling be cut up in tablets or cubes, after which they are then wrapped and packed in preferably airtight manner. Should it be desired to produce a compound in paste form, liquid fats are used, such as for example cottonseed or olive oil. In case a powdered form is desired, the fats may be omitted.

It will of course be understood that spices other than those mentioned above may be employed, that their relative quantities may be changed, or that some of the spices mentioned above may be omitted, and that, if desired, the flour may be browned sufficiently to render the use of caramel unnecessary.

By the use of the compound above described, the gravy may be thickened, browned and flavored conveniently and with little expenditure of time and without any skill being required, and a gravy so made will possess a flavor which it would be difficult to impart to it by adding the ingredients separately. It may not only be employed for making gravy to be served with roasts but will be also found most convenient for the thickening, browning and flavoring of stews, sautes, goulashes, etc. If it is desired to merely brown and thicken the gravy, the compound may be prepared in the manner above described but omitting the spices and other flavoring ingredients.

What is claimed as new is:

1. A compound for thickening gravy embodying in its composition browned flour, caramel, and an oleaginous binder.

2. A compound for thickening gravy embodying in its composition browned flour, a seasoning ingredient, an oleaginous binder, and caramel.

3. The herein described method of preparing a compound for thickening gravy consisting in browning flour in a suitable oven while being stirred, mixing with the browned flour an oleaginous binder in the presence of heat, and allowing the mixture to cool.

In testimony whereof I affix my signature in presence of two witnesses.

HENRY TILL. [L. S.]

Witnesses:
W. J. HALL,
J. C. STINCHFIELD.